US011773849B2

(12) United States Patent
Willig et al.

(10) Patent No.: US 11,773,849 B2
(45) Date of Patent: Oct. 3, 2023

(54) VACUUM PUMP, SCROLL PUMP, AND MANUFACTURING METHOD FOR SUCH

(71) Applicant: PFEIFFER VACUUM GMBH, Asslar (DE)

(72) Inventors: Michael Willig, Lahnau (DE); Jan Hofmann, Gruenbeg (DE); Jonas Becker, Bischoffen (DE); Gernot Bernhardt, Huettenberg (DE); Verena Wangorsch, Wetzlar (DE); Stefan Kallenborn, Wetzlar (DE); Wolfgang Soehngen, Waldsolms (DE); Heiko Schaefer, Solms-Niederbiel (DE); Erhard Harapat, Asslar (DE); Lars Pauli, Solms (DE)

(73) Assignee: PFEIFFER VACUUM GmbH, Asslar (DE)

( * ) Notice: Subject to any disclaimer, the term of this patent is extended or adjusted under 35 U.S.C. 154(b) by 15 days.

(21) Appl. No.: 17/063,912

(22) Filed: Oct. 6, 2020

(65) Prior Publication Data

US 2021/0102536 A1 Apr. 8, 2021

(30) Foreign Application Priority Data

Oct. 7, 2019 (EP) ..................................... 19201745
Oct. 7, 2019 (EP) ..................................... 19201749

(51) Int. Cl.
*F04C 18/02* (2006.01)
*F04C 29/04* (2006.01)
*F04C 25/02* (2006.01)

(52) U.S. Cl.
CPC .......... *F04C 18/0215* (2013.01); *F04C 25/02* (2013.01); *F04C 29/04* (2013.01); *F04C 2220/10* (2013.01); *F04C 2270/18* (2013.01)

(58) Field of Classification Search
CPC ........ F04C 18/0207–0292; F04C 25/02; F04C 2220/10; F04C 2220/12; F04C 2270/18
See application file for complete search history.

(56) References Cited

U.S. PATENT DOCUMENTS

| 5,102,316 | A | 4/1992 | Caillat et al. |
| 5,209,653 | A | 5/1993 | Murray et al. |
| 5,743,719 | A | 4/1998 | Haga et al. |
| 5,971,725 | A | 10/1999 | de Simon et al. |
| 6,074,165 | A | 6/2000 | Protos |
| 6,074,185 | A | 6/2000 | Protos |

(Continued)

FOREIGN PATENT DOCUMENTS

| CN | 103084887 A | 5/2013 |
| CN | 103089668 B | 9/2015 |

(Continued)

OTHER PUBLICATIONS

Extended European Search Report received for the European Patent Application No. 20200624.3, dated Jan. 19, 2021, 6 pages.

(Continued)

*Primary Examiner* — Mark A Laurenzi
*Assistant Examiner* — Xiaoting Hu
(74) *Attorney, Agent, or Firm* — Oblon, McClelland, Maier & Neustadt, L.L.P.

(57) ABSTRACT

The invention relates to a scroll pump comprising a pressure sensor integrated into the scroll pump.

20 Claims, 10 Drawing Sheets

(56) References Cited

U.S. PATENT DOCUMENTS

| | | |
|---|---|---|
| 7,162,797 B2 | 1/2007 | Sowa et al. |
| 9,341,187 B2 | 5/2016 | Brostrom et al. |
| 9,534,508 B2 | 1/2017 | Okudera et al. |
| 9,541,084 B2 | 1/2017 | Ignatiev et al. |
| 9,885,358 B2 | 2/2018 | Shafer |
| 2002/0025265 A1 | 2/2002 | Ikeda |
| 2005/0019169 A1 | 1/2005 | Kriehn et al. |
| 2008/0181801 A1 | 7/2008 | Stover et al. |
| 2010/0028185 A1 | 2/2010 | Kobayashi et al. |
| 2010/0223947 A1 | 9/2010 | Shibuya |
| 2011/0256007 A1 | 10/2011 | Shaffer |
| 2012/0134862 A1 | 5/2012 | Hockliffe et al. |
| 2013/0189090 A1 | 7/2013 | Okudera et al. |
| 2013/0251543 A1 | 9/2013 | Duppert et al. |
| 2014/0219846 A1* | 8/2014 | Ignatiev .............. F04C 18/0215 418/16 |
| 2014/0271233 A1* | 9/2014 | Calhoun ................ F04B 53/22 417/44.2 |
| 2017/0211390 A1 | 7/2017 | Takahata et al. |
| 2019/0120237 A1 | 4/2019 | Shiba |

FOREIGN PATENT DOCUMENTS

| | | | |
|---|---|---|---|
| CN | 104912829 A | 9/2015 | |
| CN | 204941844 U | 1/2016 | |
| CN | 206010470 U | 3/2017 | |
| CN | 107420301 A | 12/2017 | |
| DE | 199 13 593 A1 | 10/2000 | |
| DE | 10 2005 042 451 B4 | 7/2007 | |
| DE | 102018107276 A1 | 10/2018 | |
| EP | 0597804 A1 | 5/1994 | |
| EP | 0798463 A2 | 10/1997 | |
| EP | 0 754 860 B1 | 4/2002 | |
| EP | 0 836 008 B1 | 11/2002 | |
| EP | 1 275 849 A2 | 1/2003 | |
| EP | 1918585 A2 | 5/2008 | |
| EP | 1 980 749 B1 | 8/2015 | |
| EP | 3067560 A1 | 9/2016 | |
| EP | 3067560 A1 * | 9/2016 | ............. F04B 37/14 |
| EP | 3153708 A1 * | 4/2017 | ............ F04C 15/008 |
| EP | 3 153 708 B1 | 7/2019 | |
| FR | 2985557 A1 | 7/2013 | |
| FR | 3053090 A1 | 12/2017 | |
| JP | H029975 A | 1/1990 | |
| JP | 2003120529 A | 4/2003 | |
| JP | 2007-231935 A | 9/2007 | |
| JP | 2013100760 A | 5/2013 | |
| JP | 2014-154748 A | 8/2014 | |
| JP | 2014-199053 A | 10/2014 | |
| JP | 2015172358 A | 10/2015 | |
| JP | 2016-169731 A | 9/2016 | |
| JP | 2017072137 A | 4/2017 | |
| JP | 2019-73988 A | 5/2019 | |
| KR | 10-2018-0041475 A | 4/2018 | |
| KR | 101869386 B1 | 6/2018 | |
| WO | WO 03/042542 A1 | 5/2003 | |
| WO | WO 2014/072276 A1 | 5/2014 | |

OTHER PUBLICATIONS

Office Action received for the European Patent Application No. 19201745.7, dated Dec. 22, 2020, 5 pages.

Extended European Search Report received for the European Patent Application No. 19201745.7, dated Jun. 10, 2020, 13 pages.

Extended European Search Report received for the European Patent Application No. 19201749.9, dated Jun. 19, 2020, 13 pages.

Office Action received for the European Patent Application No. 19201749.9, dated Feb. 15, 2021, 7 pages.

European Communication dated Oct. 11, 2022, in European Patent Application No. 19201749.9, 28 pages

* cited by examiner

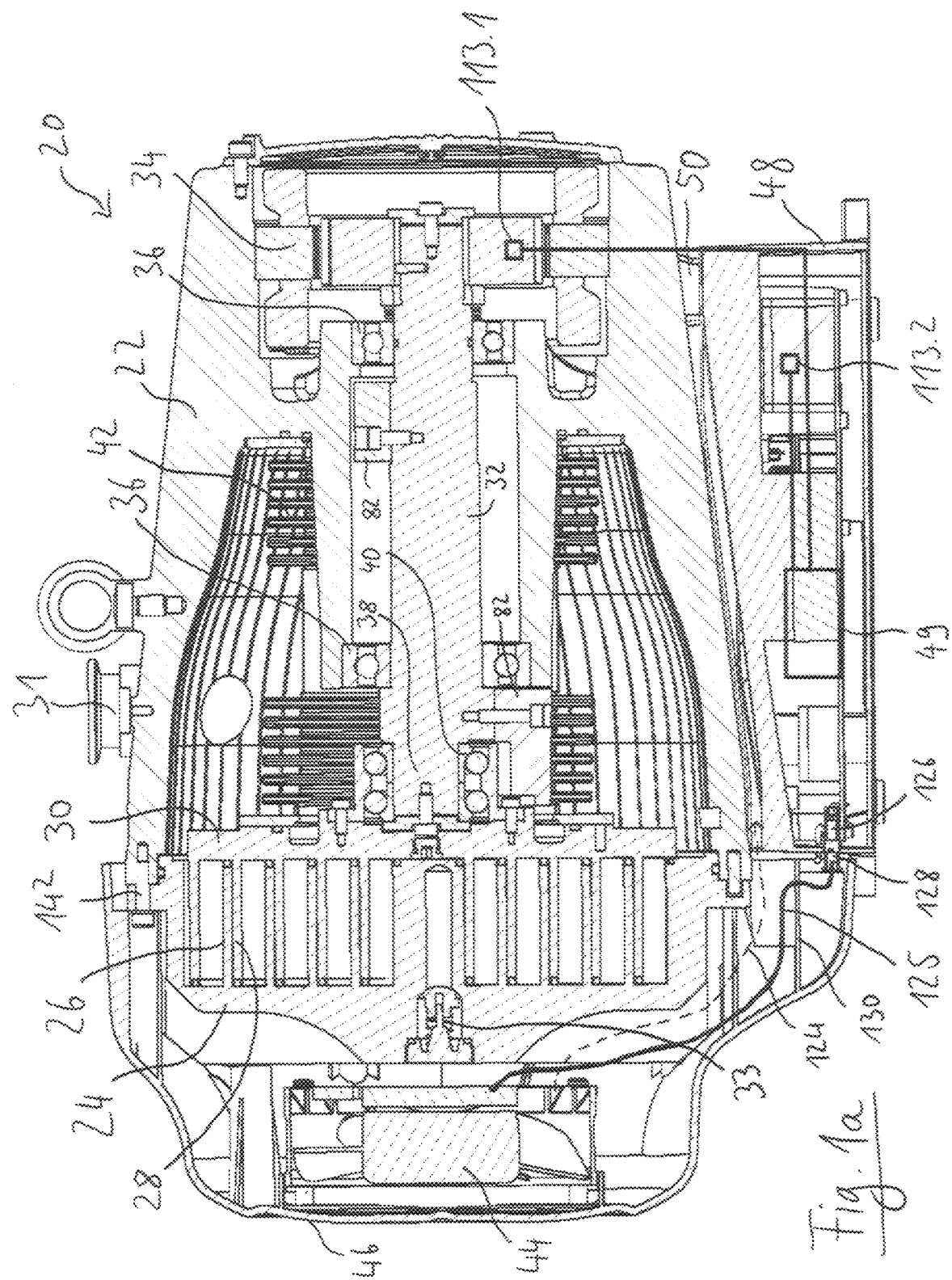

VACUUM PUMP, SCROLL PUMP, AND MANUFACTURING METHOD FOR SUCH

CROSS-REFERENCE TO RELATED APPLICATION

This application is related to and claims priority under 35 U.S.C. § 119(a) to European patent application No. EP 19201745.7, filed Oct. 7, 2019, and European patent application No. EP 19201749.9, filed Oct. 7, 2019, the contents of which are incorporated by reference in their entireties.

The present application relates to the improvement of vacuum pumps, in particular scroll pumps, and manufacturing methods for such.

SUMMARY

A first aspect of the invention starts from a scroll pump comprising a movable spiral component that can be eccentrically excited to generate a pumping effect, wherein the spiral component has a base plate and a spiral wall extending starting from the base plate. It is an object of the invention to simplify the manufacture of such a scroll pump. This object is in particular satisfied in that at least two holding projections spaced apart over the periphery of the base plate are provided outside at the base plate.

While the spiral wall extends from a flat side of the base plate and thus projects from the base plate in an axial direction, the holding projections are radial projections that project in a radial direction from the periphery of the base plate, that is from the radially outer margin of the base plate.

The spiral component can be clamped in a simple manner, in particular directly, to these holding projections. The holding projections are in particular arranged at the peripheral side and/or are uniformly distributed over the periphery.

Provision can advantageously be made that at least or exactly three or four holding projections are provided.

The holding projections can preferably be designed such that the raw material dimensions are not increased by the holding projections.

For example, a first intermediate section of the periphery of the base plate between two adjacent holding projections can have a larger radial height than a second intermediate section. A larger mass can hereby be achieved in the first intermediate section in a simple manner, which can e.g. serve for an imbalance compensation.

Provision can preferably be made that the first intermediate section is arranged at least substantially disposed opposite an outermost 120° section and/or an outermost 180° section of the spiral wall. The mass of the outermost section of the spiral wall is hereby compensated by the first intermediate section in a simple manner.

In accordance with a further embodiment, provision is made that no fastening bore is provided in the base plate in the region of or in the vicinity of least one holding projection. The stability of the spiral component can hereby be improved in a simple manner since a holding force that is opposed to a clamping apparatus by the holding projections is not weakened by a fastening bore located in the vicinity. A fastening bore in the spiral component can, for example, serve for a later fastening of a corrugated bellows and/or of a bearing element.

The object of the first aspect is also satisfied by a method of manufacturing a scroll pump, in particular such a one in accordance with the kind described above, wherein the scroll pump has a movable spiral component that can be eccentrically excited to generate a pumping effect, wherein the base plate of the spiral component is directly clamped into a clamping apparatus.

The method is considerably simplified by the direct clamping. A clamping aid to be attached to the spiral component is in particular not necessary.

A base plate and a spiral wall extending starting from the base plate are e.g. manufactured together in a chip-forming manner for the spiral component. The clamping apparatus can preferably comprise or be a jaw chuck. Alternatively or additionally, the jaws of a jaw chuck of the clamping apparatus can preferably engage at at least two holding projections arranged outside at the base plate and spaced apart over its periphery.

Provision is made in accordance with a further development that the clamping apparatus is configured such that a tool access to the spiral component is possible both from one side of the base plate at which the spiral wall is formed and from the other side, in particular the oppositely disposed side, of the base plate. In this respect, the spiral component can preferably at least substantially be machined in a clamping from both sides and/or can be produced by a machining from both sides.

The clamping apparatus can preferably be or comprise a jaw chuck, in particular a three-jaw chuck or a four-jaw chuck.

The invention generally and independently also relates to a clamping apparatus, in particular having a jaw chuck, for clamping, in particular directly clamping, a spiral component of a scroll pump, wherein the clamping apparatus is configured such that a tool access to the spiral component is made possible both from one side of the base plate at which the spiral wall is formed and from the other side of the base plate. It can preferably be a jaw chuck that, for example, has a continuous recess, in particular a bore.

A second aspect of the invention starts from a scroll pump comprising a spiral component that has a base plate and a spiral wall extending starting from the base plate, wherein the spiral wall has a groove, in which a sealing element is received, at its end remote from the base plate, with the groove being bounded by two oppositely disposed side walls. It is an object to simplify the handling of the spiral component on the assembly of the scroll pump and/or to reduce the risk of damage to the spiral component on the handling. This object is in particular satisfied in that, in a first spiral section, a first one of the side walls is thicker than a second one of the side walls in the first spiral section and/or than one or both side walls in a second spiral section.

Due to the locally thicker design of the side wall, it is locally strengthened, in particular in a region susceptible to damage. The risk of damage is thus reduced and the handling is made easier.

In accordance with an embodiment, provision is made that the first spiral section is an outer end section of the spiral wall. It is particularly susceptible to damage. Further inwardly disposed spiral sections are in particular protected by outwardly disposed spiral sections so that no "thickening" is necessary at the inside. In the sense of a preferably lower mass overall, only the outer end section of the spiral wall therefore preferably has a thickening.

In general, the first spiral section can preferably at least substantially be arranged within the last half winding of the spiral wall. It is particularly susceptible to damage. The fact is advantageously utilized in this respect that a penultimate half of the winding is indeed also generally arranged outside, but already has a certain protection due to a larger overhang of the base plate. The mass of the spiral component can thus be kept relative small.

A further development provides that the first spiral section extends over at least 100°, preferably over at least 140°. The first spiral section can preferably alternatively or additionally extend over at most 200°, preferably over at most 180°. The advantages in accordance with the invention are developed to a particularly large extent in the regions indicated.

In accordance with a further embodiment, the first spiral section is arranged in a non-pump active region of the spiral wall. The fact is hereby advantageously utilized that less strict production tolerances are generally necessary in such a non-pump active region. The thickening can thus be produced in a particularly simple manner.

The first side wall can be a radially outer side wall in accordance with a further advantageous example. This enables a particularly great reduction of the damage risk.

The first side wall can preferably, for example, be thicker by at least 0.2 mm and/or at most 1 mm, in particular at most 0.7 mm, in particular at most 0.4 mm. This enables a particularly good stabilization, in particular with a relatively low additional mass.

A further embodiment provides that the spiral component is movable and can be eccentrically excited to generate a pumping effect. The advantages in accordance with the invention are developed to a particular extent at the movable spiral component.

In accordance with a third aspect of the invention, a vacuum pump, in particular a scroll pump, is assumed that has an electronics housing in which one or more electronic components are arranged. It is an object of the invention to provide a good heat dissipation from the electronic components or a good cooling. This object is in particular satisfied in that a separate chamber, in which the electronic component is cast, is provided within the electronics housing for at least one electronic component.

In addition to the particularly good heat dissipation, the chamber additionally shields the electronic component, in particular with respect to thermal radiation and electromagnetic influences. In addition, the separate chamber enables the use of relatively little casting material, which is often expensive. The electronics housing can preferably be formed from metal.

The casting material used for casting is in particular designed as thermally conductive and/or electrically insulating.

A plurality of separate chambers can e.g. also be provided. An embodiment provides that a respective at least one electronic component is cast in the plurality of chambers. In this way, different electronic components can in particular be reliably separated from one another, in particular shielded from one another. At the same time, an advantageous heat dissipation is made possible.

Provision can, for example, and advantageously be made that at least one separate chamber is provided in which no electronic component is cast. In general, an electronics housing can, for example, be designed identically for different pumps, in particular of one series, wherein separate chambers are provided for different electronic components that are installed or not installed into the chambers depending on the kind of pump. In this respect, it is advantageous to provide at least one separate chamber in which an electronic component can be installed, in particular can be cast, that is used in another kind of pump. A kind of modular system can thus be implemented, which enables considerable cost advantages in the manufacture.

In accordance with a fourth aspect of the invention, a scroll pump is assumed. It is an object to simplify the use of the scroll pump in a vacuum system. This object is in particular satisfied in that the pump comprises an integrated pressure sensor.

A vacuum system usually already comprises a pressure sensor, for example, in a vacuum chamber. By integrating the pressure sensor into the scroll pump, the latter can now be operated largely independently and without a complex and/or expensive connection to the pressure sensor of the vacuum system. Conversely, an additional pressure sensor in the vacuum system can be dispensed with, for example. In general, the integrated pressure sensor makes it possible that the scroll pump monitors itself and that this does not have to be performed in a complex and/or expensive manner by a process control system. A wear state of the pump can thus in particular be monitored in dependence on a measured pressure. In particular in the event that the scroll pump is provided as a roughing pump for a high-vacuum pump, an increased operational safety can additionally be ensured by the integrated pressure sensor. For example, if a pressure in the scroll pump is too high, the high-vacuum pump can thus be switched off and/or interposed valves can be closed or similar measures can be taken. The high-vacuum pump can thus be reliably protected against an operation at too high a pressure.

The pressure sensor can preferably be integrated into a control of the scroll pump and/or of a vacuum system. The scroll pump or the vacuum system can thus be better controlled or regulated, and indeed on the basis of the now known pressure in the scroll pump.

In accordance with an embodiment, provision is made that the pressure sensor is provided for measuring a suction pressure of the pump or a pressure between two pump-active spiral walls or between two spiral walls in a pump-active spiral section. Both enable an even more precise monitoring of the pumping process and of a wear state of the pump, in particular of a sealing element, such as of a tip seal, or of the spiral walls.

In a further advantageous embodiment, the pressure sensor is screwed into a component of the scroll pump. This enables a simple design, on the one hand, and a flexible distribution of the scroll pump, on the other hand. Instead of the integrated pressure sensor, a dummy plug can, for example, simply be provided if an integrated pressure sensor is not absolutely necessary for the process of the user. An integrated pressure sensor can nevertheless be retrofitted in a simple manner in this case. The component into which the pressure sensor is screwed can, for example, be a housing element and/or a fixed spiral component. The pressure sensor can in particular be screwed axially into a fixed spiral component.

In accordance with a further development, provision can be made that the pressure sensor is arranged in a cooling air flow of a cooling device, for example of a fan, of the pump. The pressure sensor can thus be cooled directly in an advantageous manner, which improves its service life and measuring accuracy. The pressure sensor can preferably be arranged at least substantially at the start of the cooling air flow, namely adjacent to a fan and/or within an air guide hood.

A plurality of pressure sensors that are integrated into the scroll pump can, for example, generally also be provided. A control and a wear monitoring can hereby in particular be improved even further.

In accordance with a fifth aspect of the invention, a method of assembling a scroll pump, which comprises an eccentric shaft for eccentrically exciting a movable spiral component of the pump, is assumed in which a plurality of balance weights of different kinds are each provided for fastening to an eccentric shaft of a scroll pump of a specific kind. It is an object to be able to carry out the assembly particularly reliably. This object is in particular satisfied in that the eccentric shaft, the balance weights, and/or a further component of the pump, for example a pump housing, are dimensioned such that only a specific kind of balance weight can be assembled at the eccentric shaft at a specific fastening position.

An incorrect assembly of balance weights of a kind that is wrong for the respective pump can thus be reliably avoided. The assembly thus becomes more reliable overall.

The term "cannot be assembled" comprises that a balance weight can indeed be fastened, but a further assembly, for example an insertion of the shaft into a pump housing, is not completely possible. The fitter therefore notices that something is wrong since he cannot complete the assembly. A correct assembly is hereby ensured in a particularly simple manner. "Cannot be assembled" can additionally mean that the balance weight cannot areally contact the eccentric shaft with a contact surface provided at the balance weight, for example, since this is prevented by a shoulder at the shaft. In general, a balance weight of an incorrect kind can therefore, for example, not be brought into complete contact with the eccentric shaft. An eccentric shaft with an assembled balance weight of a wrong kind, for example, generally cannot be completely inserted into a pump housing of the pump.

Provision can, for example, be made that the eccentric shaft and/or the further component collides/collide with balance weights of at least a first kind on an attempted assembly. The first kind in this respect represents a wrong kind for the respective eccentric shaft.

In some embodiments, the eccentric shaft and/or the further component has/have a projection and/or a step that collides with balance weights of at least one first kind on an attempted assembly. An incorrect assembly is hereby prevented in a particularly simple manner.

In a sixth aspect of the invention, a vacuum pump, in particular a scroll pump, is assumed that has a pump body whose inner side bounds a pump space and at whose outer side a valve for controlling the supply of a ballast gas into the pump space is arranged, with the valve having an actuation grip that is rotatable via at least one fastening screw having a static element of the valve and/or that is fixedly connected to a rotatable element of the valve, with the fastening screw being screwed through a bore in the actuation grip into the static element or into the rotatable element. It is an object of the invention to extend the service life and/or a maintenance interval of the valve and/or of at least one of its components. This object is in particular satisfied in that a cover is provided that closes the bore.

The penetration of contamination into the bore and finally into function-sensitive regions is prevented or at least reduced by the cover.

The valve can, for example, have an O-ring, in particular an axially pressed O-ring, as a sealing means. When the valve is actuated, a relative movement is exerted onto the O-ring. If contaminants, for example particles, move to the sliding surface of the O-ring, this can lead to a premature failure of the O-ring. This is reliably reduced or prevented by the cover.

The pump body can, for example, be a static spiral component and/or a housing component.

The cover can, for example, be inserted into the actuation grip. For example, the cover can be inserted into the or a bore. Further generally, the cover can, for example, be held at the actuation grip, in particular in the bore, by an interference fit. The cover can, for example, have one or more projections, for example in the form of a pin, for the insertion.

Provision can further be made that the cover is inserted into at least two bores and/or that the cover closes at least one bore into which it is not inserted.

In a further embodiment, the actuation grip has a base element composed of metal and a plastic section at least in a region that can be gripped for the purpose of a manual actuation. This ensures a good corrosion resistance at simultaneously low manufacturing costs. Furthermore, the plastic section remains cooler and can be better operated due to the thermal conductivity that is limited with respect to metal. The base element can, for example, be manufactured from stainless steel. It can be extrusion-coated with plastic, for example. The base element can e.g. comprise a check valve and/or a connection thread.

A check valve can e.g. be arranged integrated in the actuation grip. Furthermore, the gas ballast valve can, for example, in particular be designed with two stages. An inlet and/or a connection for the ballast gas can furthermore be provided in the actuation grip, for example.

In a seventh aspect of the invention, a vacuum pump, in particular a scroll pump, is assumed that has a fan controllable in its rotational speed for cooling the pump. It is an object to design the cooling particularly in accordance with requirements and/or to reduce the noise emission of the fan. This object is in particular satisfied in that it has a temperature sensor and a control device that is configured to regulate the rotational speed of the fan in dependence on a power consumption of a drive of the pump and on a temperature measured by the temperature sensor.

The measured temperature can preferably be a temperature in the pump, for example of a pump component and/or of a space in the pump, for example of a suction space or a pump space. Provision is made in an embodiment that the regulation takes place in dependence on a temperature of a motor, of a motor winding, of drive electronics or power electronics, of a pump body, and/or of a housing of the pump measured by the temperature sensor. These temperature values can generally, for example, be measured by a plurality of temperature sensors or a plurality of temperature sensors can generally be provided.

In accordance with an embodiment, provision is made that a first threshold value of the temperature is defined, wherein the regulation only takes place at a measured temperature above the first threshold value, and/or wherein the rotational speed of the fan is kept constant at zero or at a minimum rotational speed below the first threshold value. The noise emission of the fan can hereby be kept low when the cooling requirement is low, namely when the measured temperature is low. In addition, the pump can hereby heat up quickly to a desired operating temperature after the switching on. This is, for example, advantageous since the gap dimensions between the spirals are dependent on a thermal expansion of the components and are therefore only optimal within the framework of specific operating temperature ranges. The embodiment therefore enables a fast achievement of an advantageous pump performance. In addition, an improved compatibility with respect to condensing media is achieved by a fast increase in the temperature.

The first threshold can preferably amount to at least 40° C. and/or to at most 60° C., in particular to approximately 50° C. The minimum rotational speed is generally lower than a maximum rotational speed, in particular significantly lower, and in particular amounts to less than 30%, in particular to less than 20%, in particular to less than 10%, of the maximum rotational speed.

In accordance with a further embodiment, a second threshold value of the temperature is defined, wherein the rotational speed of the fan is kept constant at a maximum rotational speed at a measured temperature above the second threshold value. It is hereby ensured in a simple manner at high temperatures that the maximum cooling power is achieved. The cooling can thus be performed in accordance with requirements in a simple manner. The embodiment with the second threshold value is generally independent of the embodiment with the first threshold value and vice versa. However, they can be advantageously combined. In this respect, the designation "second" threshold value is merely selected for ease of reference and does not require that a "first" threshold value is additionally defined.

In the event that a plurality of temperature sensors are provided, the above-described threshold values can, for example, be different for the plurality of temperature sensors.

The control device can, for example, be configured to reduce a drive power of the pump in dependence on a temperature of the vacuum pump measured by a temperature sensor. This function can also be designated as "derating". Provision can, for example, be made that the fan is set to its maximum rotational speed when a derating condition is satisfied and/or when the pump is in a derating state, that is when the drive power is reduced.

The rotational speed of the fan can preferably be controlled by means of pulse width modulation (PWM).

A maximum rotational speed of the fan can, for example, be adaptable. Thus, it can, for example, be advantageous for the purpose of an increased water vapor compatibility to reduce the maximum rotational speed of the fan.

An eighth aspect of the invention starts from a vacuum pump, preferably a scroll pump, comprising an electrically driven fan and an air guide hood. It is an object of the invention to establish an electrical connection of the fan to a supply connection in a particularly reliable manner, in particular for a long time. This object is in particular satisfied in that a conductor, preferably a cable, leads from the fan, preferably through the air guide hood, to a supply connection for the fan, wherein the conductor is connected to the supply connection via an electrical connector, preferably a releasable electrical connector, preferably a plug, and wherein the connector is separated from an air flow path, defined by the air guide hood, by means of a partition wall. The connector can preferably be at least partly arranged within the air guide hood. The partition wall can e.g. be connected in one part to the air guide hood.

Environmental air, which can also comprise contamination and dust, is sucked in via the fan and conducted along a defined air flow path. The sucked-in contamination or dust is prevented by the partition wall from being able to penetrate the connector and in particular, as a consequence, from being able to penetrate into an electronics housing of the pump. The partition wall rather has the effect that the sucked-in air is merely conducted past the connector at a spacing.

The fan can preferably be arranged at the air guide hood and can in particular be fastened thereto. The connector can preferably be releasable.

Provision is made in an embodiment that the conductor, in particular the cable, is led from the connector through a recess in the partition wall. Thus, the conductor can be led from the connector to the fan in a simple manner. The recess can, for example, be a notch that can preferably be V-shaped.

A further embodiment provides that the recess is arranged offset from the connector in a peripheral direction. A path from the recess to the connector is hereby extended so that contaminants passing through the recess have to travel a longer distance to the connector and the likelihood that they reach the connector is thus reduced. A labyrinth effect is hereby implemented in a simple manner.

In a ninth aspect of the invention, a scroll pump is assumed comprising a spiral component that is in a fixed position in operation and that is releasably connected to a housing element of the pump. It is an object of the invention to simplify a release of the spiral component from the housing element. This object is in particular satisfied in that at least one forcing-off thread is provided at the spiral component and/or at the housing element for releasing the spiral component from the housing element, preferably with two forcing-off threads being provided that are arranged in a radially oppositely disposed manner.

The spiral component can be pushed off from the housing element in a simple and defined manner by the forcing-off thread and can thus be released.

In general, an associated passage bore is preferably not present in axial alignment with the forcing-off thread at the respective other component. Rather, a planar surface or a depression of the other component can preferably contact or be associated with the forcing-off thread.

A plurality of forcing-off threads, in particular at least two forcing-off threads, can generally also be provided and can preferably be arranged uniformly distributed over the periphery and/or arranged in a radially oppositely disposed manner. The spiral component can hereby be released particularly uniformly. For example, a canting can thus be avoided such as could, for example, occur without a forcing-off thread on a release of a spiral component that contacts the housing element with a transition fit. Any sealing means present could also cant or block. These problems of the irregular loading can be avoided or at least reduced by the forcing-off thread, in particular the plurality of forcing-off threads.

In accordance with a further embodiment, provision is made that a component adjacent to the spiral component and/or to the housing element is configured such that it would collide with a screw head of a forcing-off screw possibly screwed into the forcing-off thread so that the component could not be completely assembled. An incorrect assembly can hereby be avoided in a simple manner since it is ensured that no screw is screwed into the forcing-off thread that could, for example, prevent a correct placement of the spiral component at the housing element. The component can in particular be an air guide hood. A projection and/or a dome can, for example, be provided for a collision with the screw head.

BRIEF DESCRIPTION OF THE DRAWINGS

It is understood that the individual aspects of the invention, and indeed also those aspects that are described in the following with reference to the Figures, can respectively be advantageously combined with one another.

The invention will be explained only by way of example in the following with reference to the schematic drawings.

FIG. 1a shows the scroll pump in the view in accordance with FIG. 1 with additional representations;

DETAILED DESCRIPTION

Figure 1:
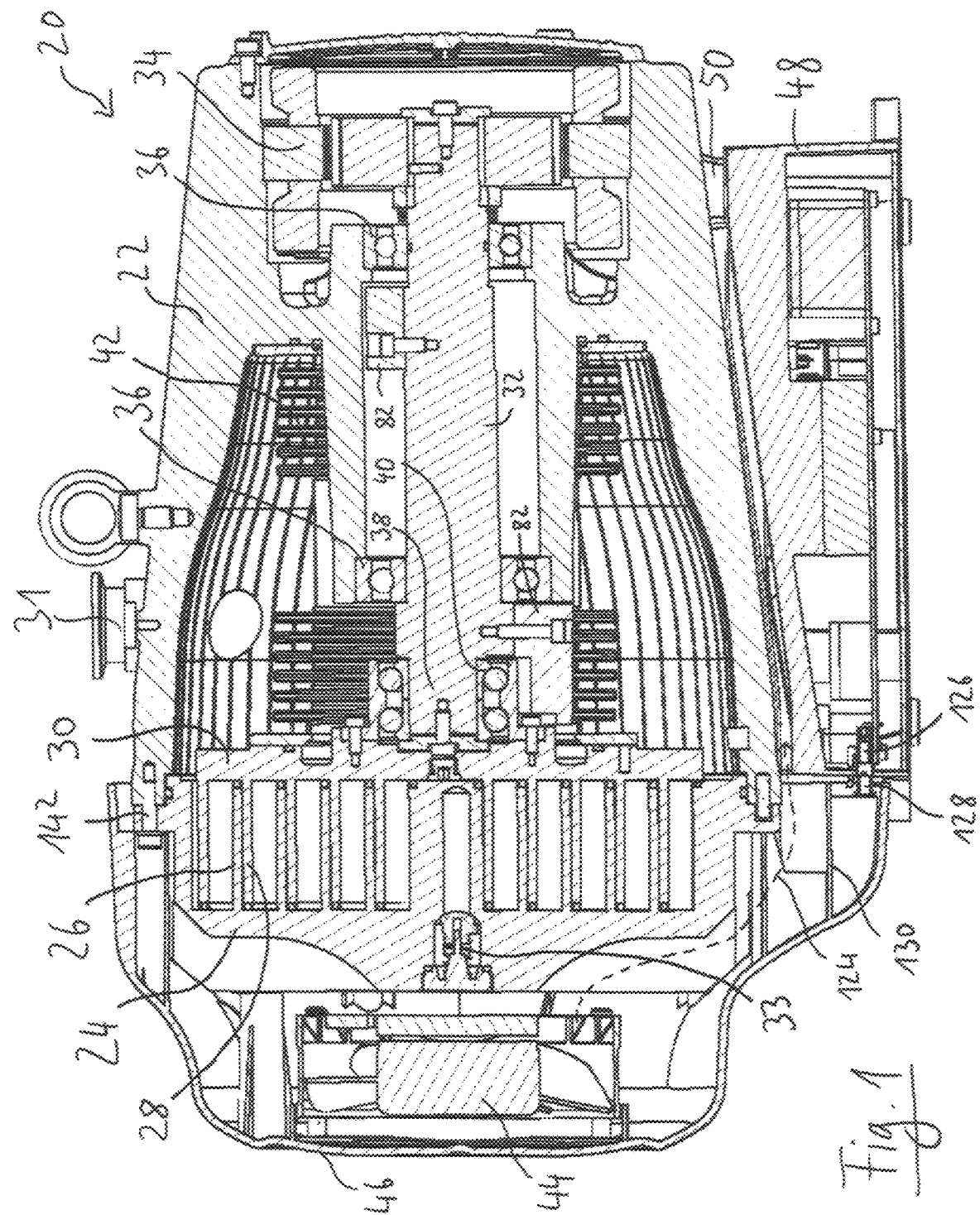
FIG. 1 shows a scroll pump in a sectional view.

FIG. 1 shows a vacuum pump configured as a scroll pump 20. It comprises a first housing element 22 and a second housing element 24, wherein the second housing element 24 has a pump-active structure, namely a spiral wall 26. The second housing element 24 therefore forms a fixed-position spiral component of the scroll pump 20. The spiral wall 26 cooperates with a spiral wall 28 of a movable spiral component 30, wherein the movable spiral component 30 is eccentrically excited via an eccentric shaft 32 to generate a pumping effect. In this respect, a gas to be pumped is delivered from an inlet 31, which is defined in the first housing element 22, to an outlet 33 which is defined in the second housing element 24.

Figure 2:
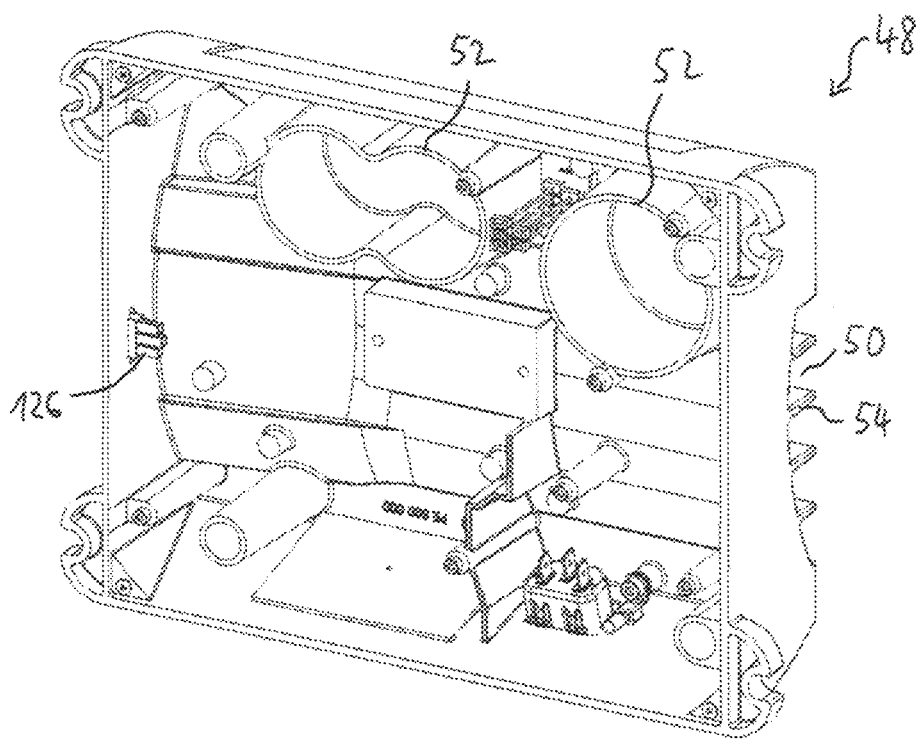
FIG. 2 shows an electronics housing of the scroll pump.

The eccentric shaft 32 is driven by a motor 34 and is supported by two rolling element bearings 36. It comprises an eccentric pin 38 that is arranged eccentrically with respect to its axis of rotation and that transmits its eccentric deflection to the movable spiral component 30 via a further rolling element bearing 40. For the purpose of sealing, an end of a corrugated bellows 42 that is the end at the left side in FIG. 2 is additionally attached to the movable spiral element 30 and the end of said corrugated bellows 42 at the right side is fastened to the first housing element 22. The end of the corrugated bellows 42 at the left side follows the deflection of the movable spiral component 30.

The scroll pump 20 comprises a fan 44 for generating a cooling air flow. For this cooling air flow, an air guide hood 46 is provided to which the fan 44 is also fastened. The air guide hood 46 and the housing elements 22 and 24 are shaped such that the cooling air flow substantially flows around the total pump housing and a good cooling performance is thus achieved.

The scroll pump 20 further comprises an electronics housing 48 in which a control device 49 (see FIG. 1a) and power electronics components for driving the motor 34 are arranged. The electronics housing 48 additionally forms a foot of the pump 20. A channel 50, through which an air flow generated by the fan 44 is guided along the first housing element 22 and also along the electronics housing 48, is visible between the electronics housing 48 and the first housing element 22 so that both are effectively cooled.

The electronics housing 48 is illustrated in more detail in FIG. 2. It comprises a plurality of separate chambers 52. Electronic components can be cast in these chambers 52 and are thus advantageously shielded. A quantity of the casting material that is as minimal as possible can preferably be used on the casting of the electronic components. For example, the casting material can first be introduced into the chamber 52 and the electronic component can subsequently be pressed in. The chambers 52 can preferably be designed such that different variants of the electronic components, in particular different equipping variants of a circuit board, can be arranged and/or can be cast in the electronics housing 48. For specific variants, individual chambers can in this respect also remain empty, i.e. not have any electronic components. A so-called modular system can thus be implemented in a simple manner for different pump types. The casting material can in particular be thermally conductive and/or electrically insulating.

A plurality of walls or ribs 54 that define a plurality of channels 50 for conducting a cooling air flow are formed at a side of the electronics housing 48 that is the rear side with respect to FIG. 2. The chambers 52 also enable a particularly good heat dissipation from the electronic components arranged in them, in particular in connection with a thermally conductive casting material, and toward the ribs 54. The electronic components can thus be cooled particularly effectively and their service life is improved.

Figure 3:
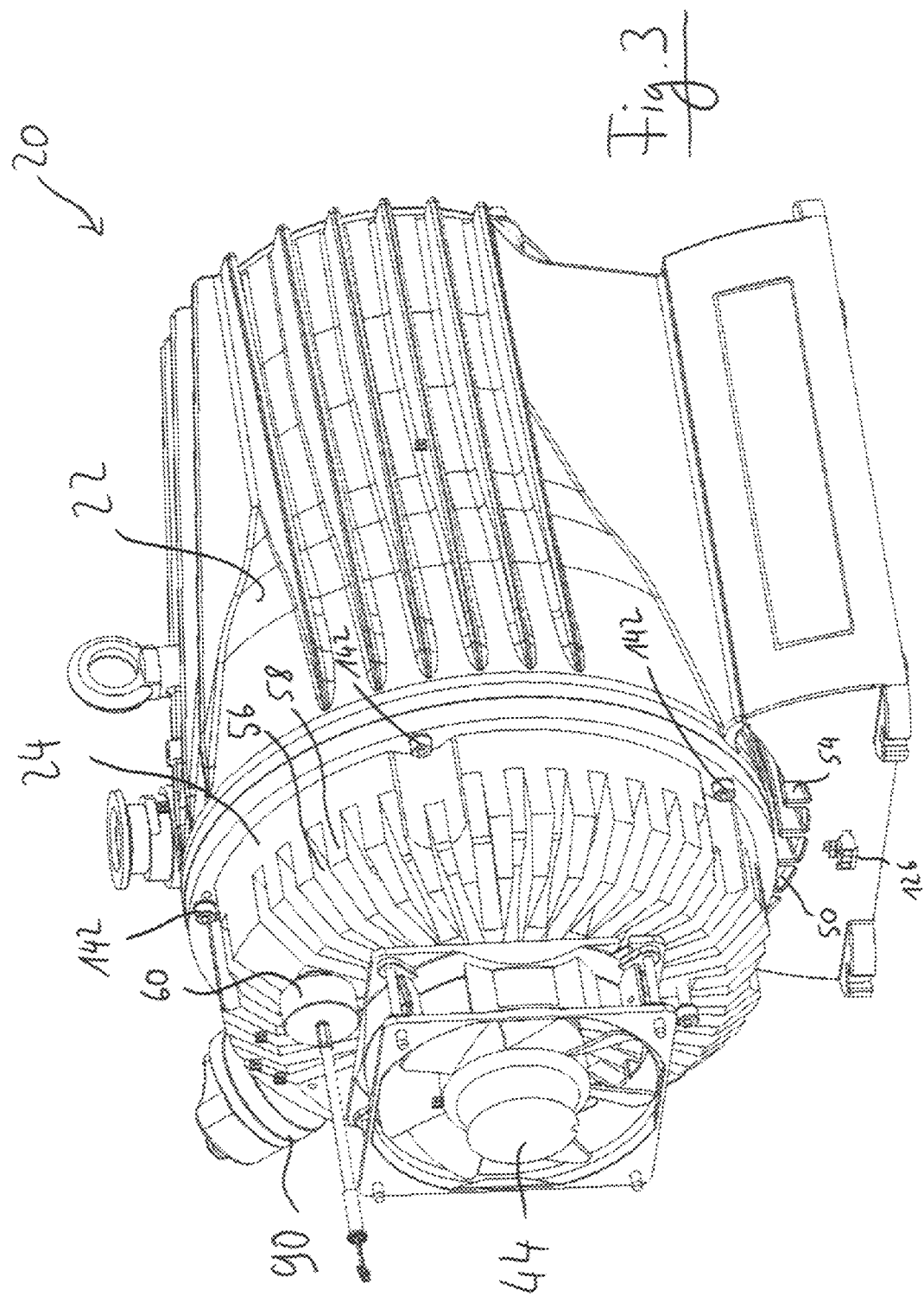
FIG. 3 shows the scroll pump in a perspective view, with selected elements being exposed.

In FIG. 3, the scroll pump 20 is shown perspectively as a whole, however, with the air guide hood 46 being masked so that the fixed-position spiral component 24 and the fan 44 are in particular visible. A plurality of recesses 56 arranged in a star shape are provided at the fixed-position spiral component 24 and each define ribs 58 arranged between the recesses 56. The cooling air flow generated by the fan 44 passes through the recesses 56 and past the ribs 58 and thus particularly effectively cools the fixed-position spiral component 24. In this respect, the cooling air flow first flows around the fixed-position spiral component 24 and only then around the first housing element 22 or the electronics housing 48. This arrangement is particularly advantageous since the pump-active region of pump 20 has a high heat development in operation due to the compression and is therefore primarily cooled here.

The pump 20 comprises a pressure sensor 60 integrated into it. Said pressure sensor 60 is arranged within the air guide hood 46 and is screwed into the fixed-position spiral component 24. The pressure sensor 60 is connected to the electronics housing 48 and to a control device arranged therein via a cable connection that is only partly shown. The pressure sensor 60 is integrated into the control of the scroll pump 20 in this respect. For example, the motor 34, which is visible in FIG. 1, can be controlled in dependence on a pressure measured by the pressure sensor 60. For example, when the pump 20 is used in a vacuum system as a roughing pump for a high-vacuum pump, the high-vacuum pump can, for example, only be switched on when the pressure sensor 60 measures a sufficiently low pressure. The high-vacuum pump can thus be protected from damage.

Figure 4:
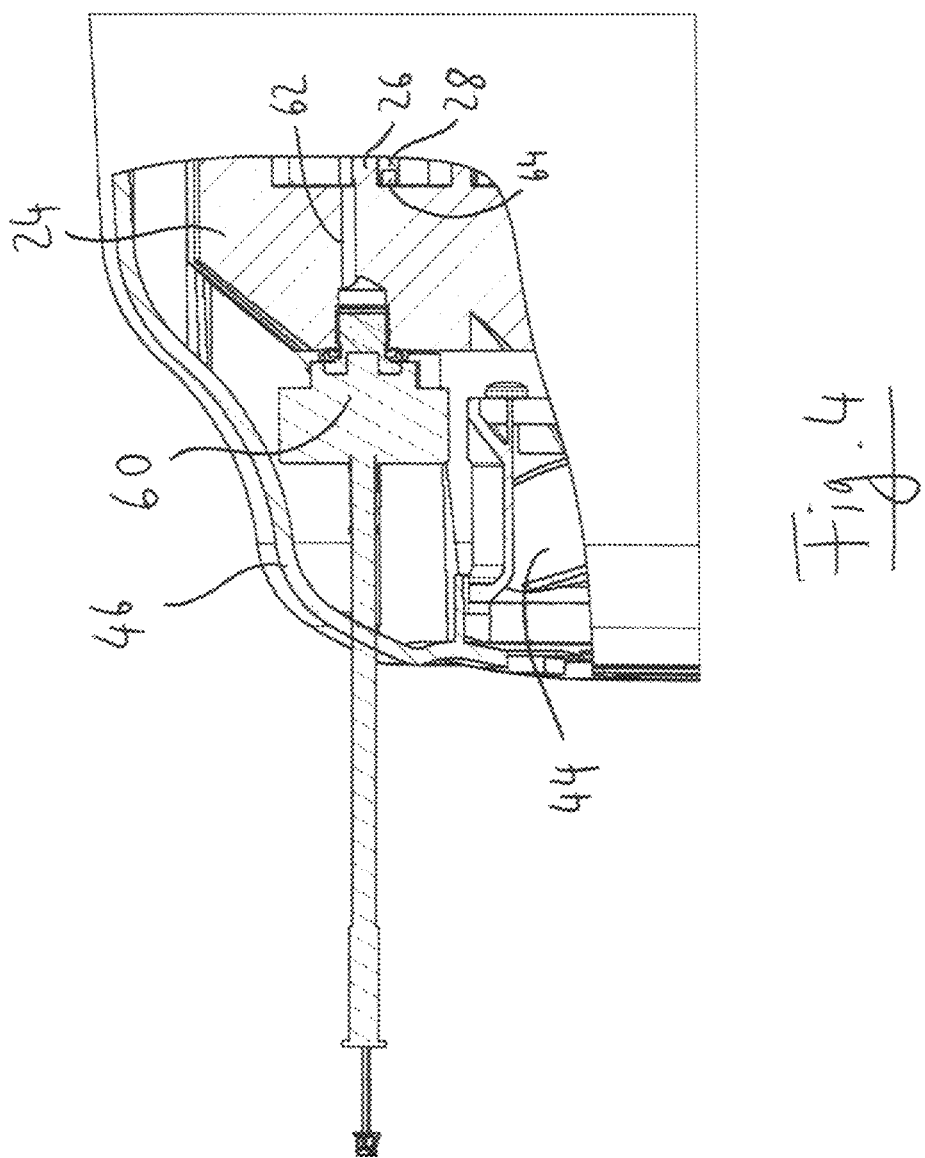
FIG. 4 shows a pressure sensor integrated into the pump.

FIG. 4 shows the pressure sensor 60 and its arrangement at the fixed-position spiral component 24 in a cross-sectional representation. A channel 62 is provided for the pressure sensor 60 and here opens into a non-pump active outer region between the spiral walls 26 and 28 of the fixed-position or movable spiral components 24 and 30. Thus, the pressure sensor measures a suction pressure of the pump. Alternatively or additionally, a pressure between the spiral walls 26 and 28 in a pump-active region can, for example, also be measured. Depending on the position of the pressure sensor 60 or of the channel 62, intermediate pressures can therefore also be measured, for example.

The pressure sensor 60, for example via the determination of a compression, in particular allows a recognition of a wear state of the pump-active components, in particular of a sealing element 64 that is also designated as a tip seal. Furthermore, the measured suction pressure can also be used for a regulation of the pump (inter alia the pump speed). For example, a suction pressure can thus be predefined at the software side and a suction pressure can be set by varying the pump speed. It is also conceivable that, depending on the measured pressure, a pressure increase caused by wear can be compensated by an increase in the rotational speed. Thus, a tip seal change can be postponed or larger change intervals can be implemented. The data of the pressure sensor 60 can therefore generally e.g. be used for a wear determination, for a situational control of the pump, for a process control, etc.

The pressure sensor 60 can, for example, optionally be provided. Instead of the pressure sensor 60, a blind plug can, for example, be provided to close the channel 62. A pressure sensor 60 can then, for example, be retrofitted if required. Provision can in particular be made with respect to the retrofitting, but also generally advantageously, that the pressure sensor 60 is automatically recognized on the connection to the control device of the pump 20.

The pressure sensor 60 is arranged in the cooling air flow of the fan 44. It is hereby also advantageously cooled. This additionally has the result that no special measures have to be taken for a higher temperature resistance of the pressure sensor 60 and an inexpensive sensor can consequently be used.

In addition, the pressure sensor 60 is in particular arranged such that the outer dimensions of the pump 20 are not increased by it and the pump 20 consequently remains compact.

Figure 5:
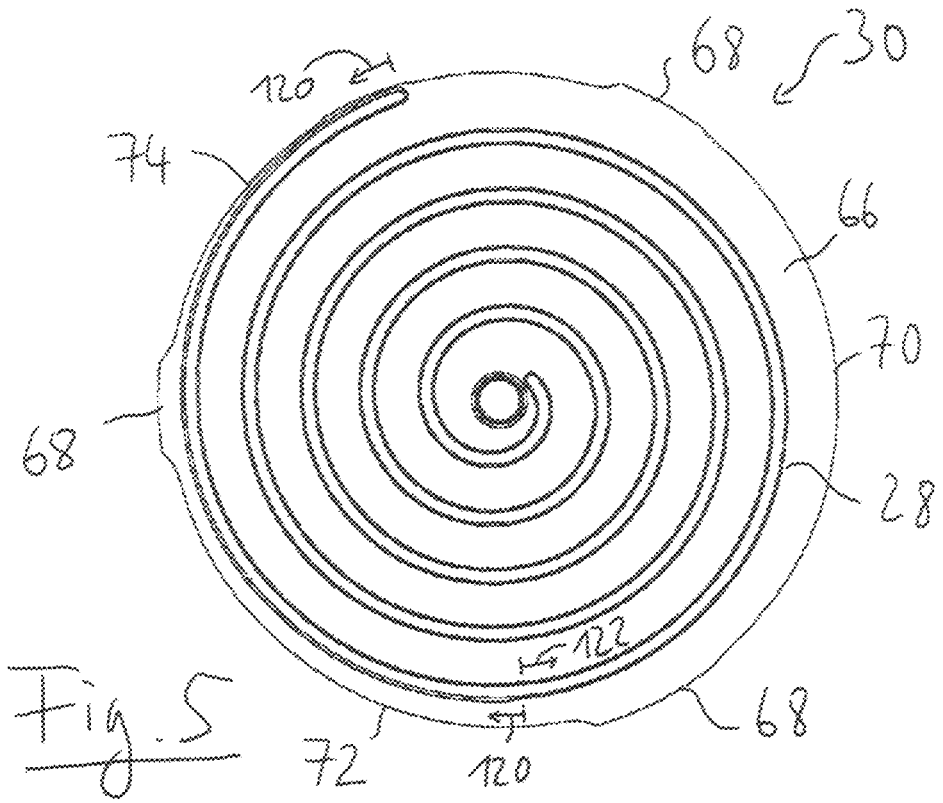
FIG. 5 shows a movable spiral component of the pump.
Figure 6:
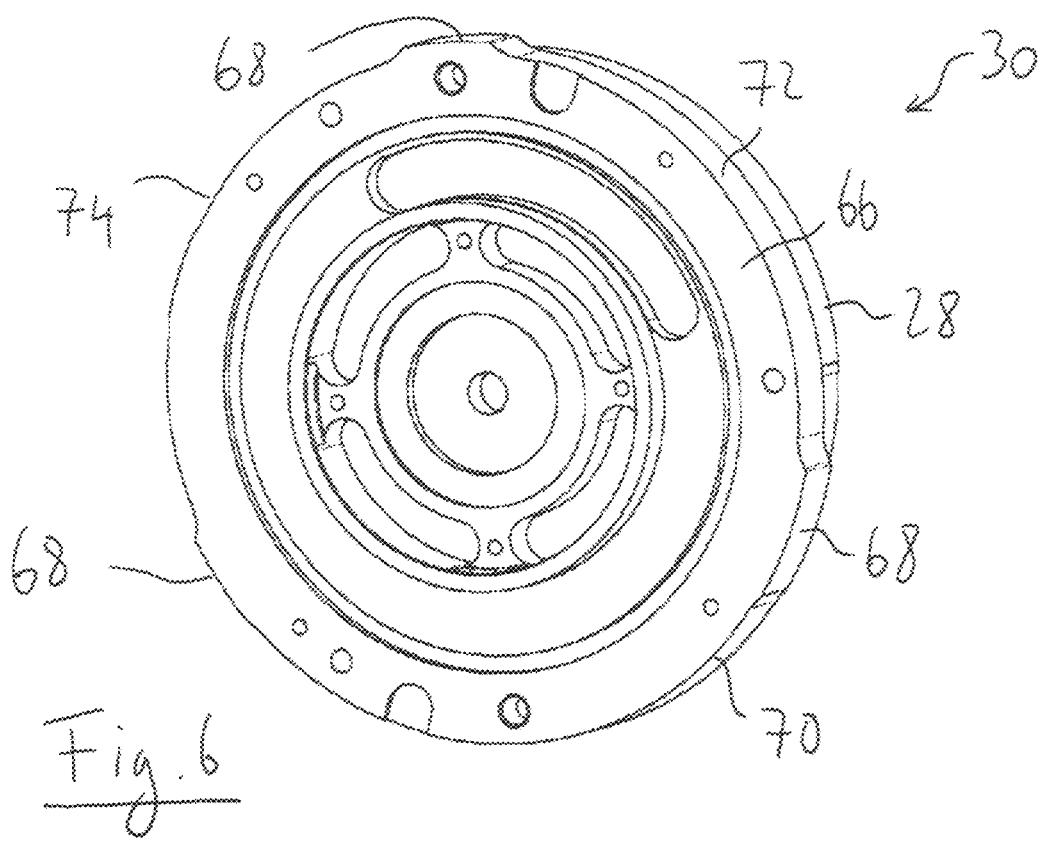
FIG. 6 shows the spiral component from another side disposed opposite the side visible in FIG. 5.

In FIGS. 5 and 6, the movable spiral component 30 is shown in different views. In FIG. 5, the spiral structure of the spiral wall 28 is particularly easily visible. In addition to the spiral wall 28, the spiral component 30 comprises a base plate 66, starting from which the spiral wall 28 extends.

A side of the base plate 66 remote from the spiral wall 28 is visible in FIG. 6. At this side, the base plate inter alia comprises a plurality of fastening recesses, for instance for fastening the bearing 40 and the corrugated bellows 42 that are visible in FIG. 1.

Three holding projections 68 are provided outside at the base plate 66 that are spaced apart over the periphery of the base plate 66 and that are uniformly distributed over the periphery. The holding projections 68 extend radially outwardly in this respect. The holding projections 68 in particular all have the same radial height.

A first intermediate section 70 of the periphery of the base plate 66 extends between two of the holding projections 68. This first intermediate section 70 has a larger radial height than a second intermediate section 72 and than a third intermediate section 74. The first intermediate section 70 is arranged disposed opposite an outermost 120° section of the spiral wall 28.

On the manufacture of the movable spiral component 30, the base plate 66 and the spiral wall 28 are preferably manufactured together from a solid material in a cutting manner, i.e. the spiral wall 28 and the base plate 66 are formed in one part.

The spiral component 30 can, for example, be directly clamped to the holding projections 68 on a finishing operation. For example, within the framework of one and the same clamping, the side of the base plate 66 shown in FIG. 6 can also be machined and the fastening recesses can in particular be introduced. In general, the chip-forming manufacture of the spiral wall 28 can also take place from the solid material within the framework of this clamping.

Figure 7:
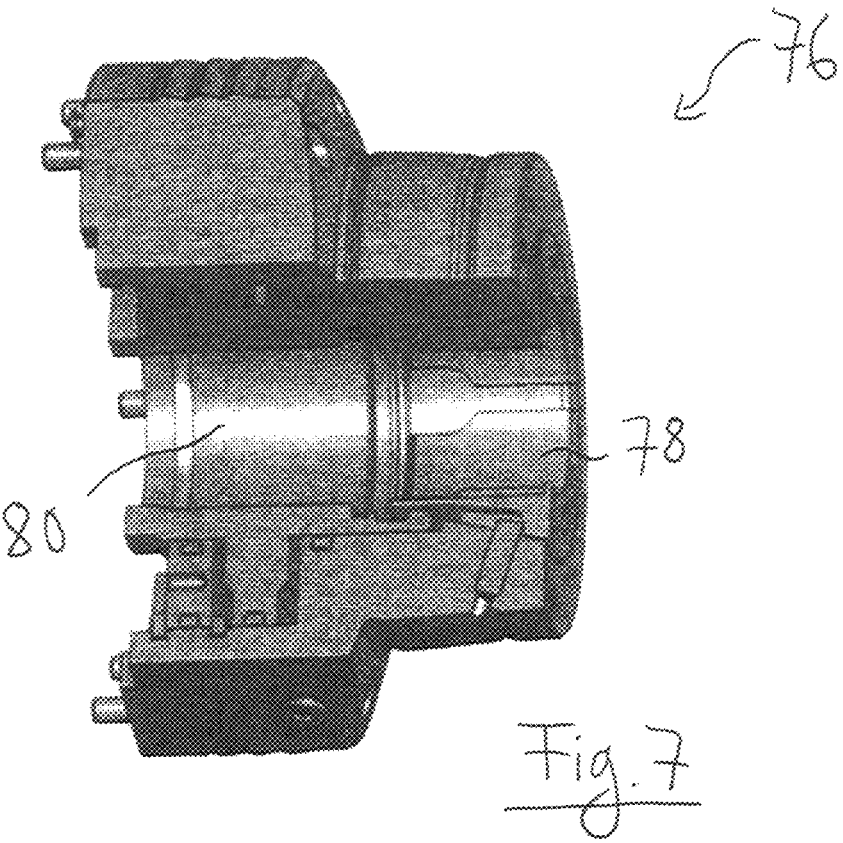
FIG. 7 shows a clamping apparatus for a spiral component.

For this purpose, the spiral component 30 can, for example, be clamped by a clamping apparatus 76 such as is shown in FIG. 7. Said clamping apparatus 76 has a hydraulic three-jaw chuck 78 for direct contact with the three holding projections 68. In addition, the clamping apparatus 76 has a continuous recess 80 through which a tool access to the spiral component 30, in particular to the side thereof that is shown in FIG. 6, is made possible. Machining processes can thus take place from both sides during a clamping, in particular at least one finishing machining of the spiral wall 28 and an introduction of fastening recesses.

The contour of the holding projections 68 and the clamping pressure of the clamping apparatus 76 are preferably selected such that no critical deformations of the spiral component 30 take place. The three holding projections 68 are preferably selected such that the outer dimension, that is the maximum diameter of the spiral component 30, is not increased. Material, on the one hand, and a cutting volume, on the other hand, can thus be saved. The holding projections 68 are in particular designed and/or arranged at such an angular position such that the accessibility of the screw connection of the corrugated bellows 42 is present. The number of screw connection points of the corrugated bellows 42 is preferably unequal to the number of holding projections 68 at the movable spiral component 30.

Two balance weights 82 are attached to the eccentric shaft 32 of FIG. 1 to compensate an imbalance of the excited system. The region of the balance weight 82 that is at the right side in FIG. 1 is shown in enlarged form in FIG. 8. The balance weight 82 is fixedly screwed to the eccentric shaft 32.

Figure 9:
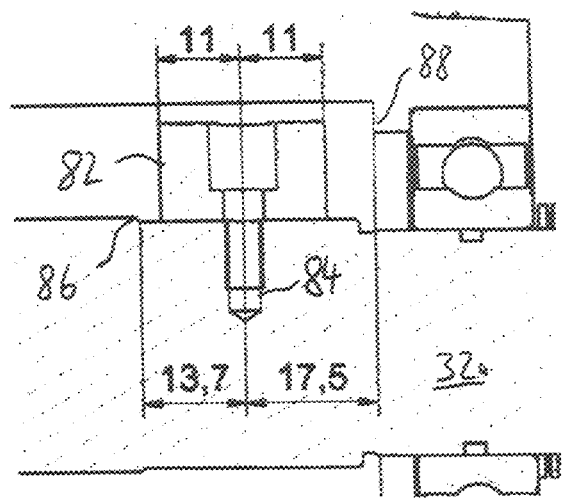

A similar image section is shown in FIG. 9 for another scroll pump that preferably belongs to the same series of the pump 20 of FIG. 1. The pump on which FIG. 9 is based in particular has other dimensions and therefore requires a different balance weight 82.

The eccentric shafts 32, the balance weights 82, and the housing elements 22 are dimensioned such that only one specific kind of the two kinds of balance weights 82 shown can be assembled at the eccentric shaft 32 at the respective fastening position shown.

Figure 8:
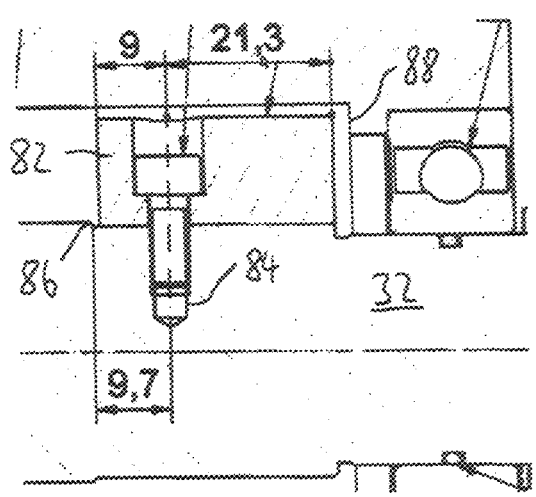
FIGS. 8 and 9 each show an eccentric shaft with a balance weight from different scroll pumps.

The balance weights 82 are dimensioned in FIGS. 8 and 9 together with specific dimensions of the construction space provided for them to illustrate that the balance weight 82 of FIG. 9 cannot be assembled at the eccentric shaft 32 and vice versa. It is understood that the specified dimensions are named purely by way of example.

For example, a spacing between a fastening bore 84 and a shaft shoulder 86 amounts to 9.7 mm in FIG. 8. The balance weight 82 of FIG. 8 is shorter in the corresponding direction, namely is 9 mm long, and can therefore be assembled without problem. The balance weight 82 of FIG. 9 has a longitudinal extent of 11 mm measured from the fastening bore in each case, Thus, the balance weight 82 of FIG. 9 cannot be assembled at the eccentric shaft 32 of FIG. 8 since the shaft shoulder 86 collides with the balance weight 82 on an attempted assembly or since the balance weight 82 of FIG. 9 thus cannot be completely brought into contact with the eccentric shaft 82 of FIG. 8. Since the balance weight 82 of FIG. 9 is larger in both measured dimensions than the spacing from the fastening bore 84 and the shaft shoulder 86 in FIG. 8, an assembly in the reverse direction is also prevented. In addition, the dimension of 21.3 mm of the balance weight 82 of FIG. 8 prevents a reversed and consequently incorrect assembly orientation of the otherwise correct balance weight 82.

In FIG. 9, a spacing in the longitudinal direction between the fastening bore 84 and a housing shoulder 88 amounts to 17.5 mm. The balance weight 82 of FIG. 8 with its extent of 21.3 mm would collide with the housing shoulder 88 on the insertion of the eccentric shaft 32 of FIG. 9 so that a complete assembly would not be possible. The incorrect assembly is indeed first possible, but is reliably recognized. On an assembly of the balance weight 82 of FIG. 8 at the eccentric shaft 32 of FIG. 9 in a manner rotated about the axis of the fastening bore 84, the extent of 21.3 mm would collide with the shaft shoulder 86 that is only arranged at a spacing of 13.7 mm from the fastening bore 84.

The balance weights 82, in particular a motor-side balance weight 82, are generally designed such that a confusion of the balance weight with such other construction sizes on the assembly and/or on the service is avoided. The balance weights are preferably fastened by means of passage screws. Similar balance weights of different pump sizes are in particular designed such that an assembly of the incorrect balance weight is prevented due to adjacent shoulders on the shaft and due to the positions of the thread and the passage bore of the balance weight and of shoulders within the housing.

Figure 10:
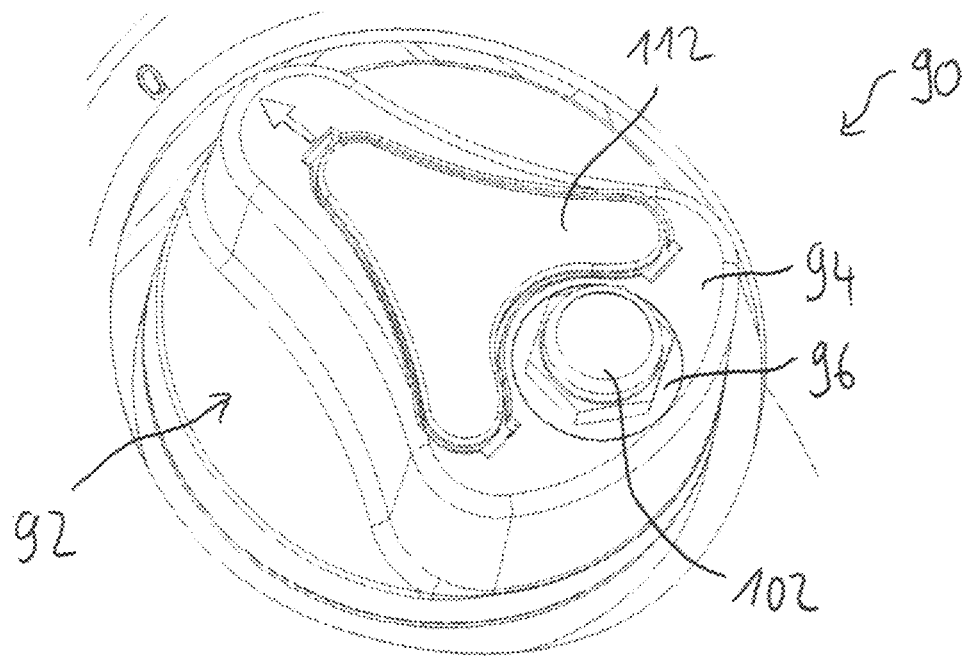
FIG. 10 shows a gas ballast valve with an actuation grip in a perspective view.
Figure 11:
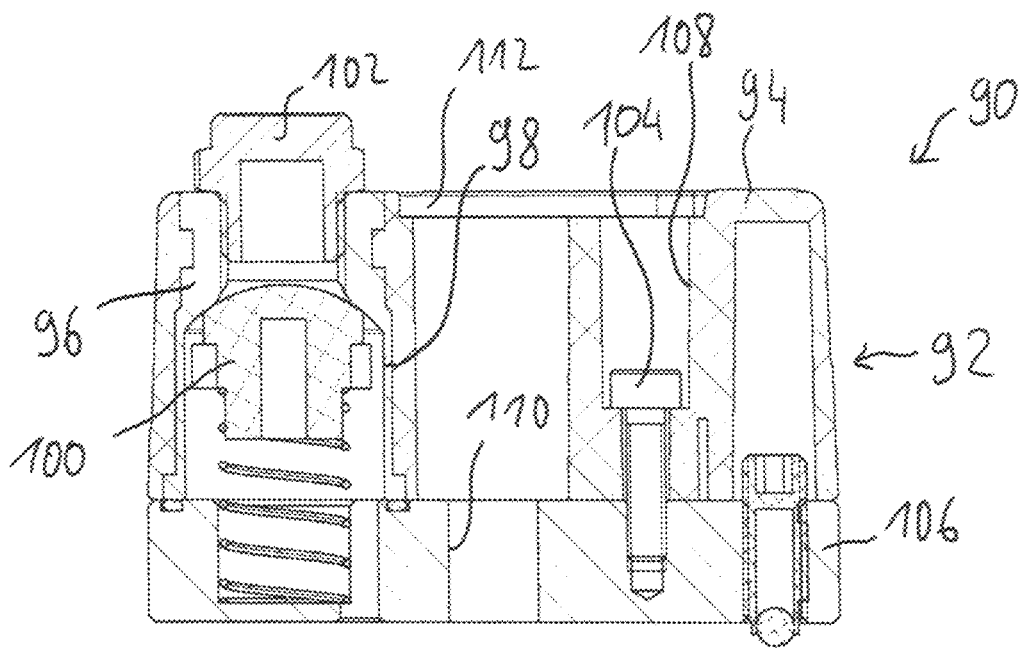
FIG. 11 shows the valve of FIG. 10 in a sectional view.

A gas ballast valve 90 of the scroll pump 20 is shown in FIGS. 10 and 11. It is also visible in the overall representation of the pump 20 in FIG. 3 and is arranged at the fixed-position spiral component 24.

The gas ballast valve 90 comprises an actuation grip 92. It comprises a plastic body 94 and a base element 96 that is preferably manufactured from stainless steel. The base element 96 comprises a throughgoing bore 98 that, on the one hand, is provided for the connection and the introduction of a ballast gas and, on the other hand, comprises a check valve 100. In the representations, the bore 98 is additionally closed by means of a plug 102. Instead of the plug 102, a filter can, for example, also be provided, wherein the ballast gas can preferably be air and in particular directly enters into the valve 90 via the filter.

The actuation grip 92 is fastened to a rotatable element 106 of the valve 90 by three fastening screws 104 which are arranged in a respective bore 108 and of which only one is visible in the selected sectional representation of FIG. 11. The rotatable element 106 is rotatably fastened to the second housing element 24 by a fastening screw, not shown, that extends through a bore 110.

To actuate the valve 90, a torque manually applied to the actuation grip 92 is transmitted to the rotatable element 106 and the latter is thus rotated. The bore 98 thus enters into communication with an interior of the housing. Three switching positions are in this respect provided for the valve 90, namely the one shown in FIG. 10 which is a blocking position and a respective position rotated to the left and to the right, in which positions the bore 98 is in communication with different regions of the interior of the housing.

The bores 108 and 110 are closed by a cover 112. The sealing effect of the gas ballast valve 90 is based on axially pressed O-rings. On an actuation on the valve 90, a relative movement is exerted onto the O-rings. If contaminants, such as particles, move to the surface of an O-ring, this brings along the risk of a premature failure. The cover 112 prevents a penetration of contamination and similar at the screws of the grip 92.

This cover 112 is fastened via an interference fit of three centering elements. Specifically, the cover 112 has an insertion pin, not shown, for each bore 108 by which the cover 112 is held in the bores 108. The bores 108 and 110 and the fastening screws arranged therein are thus protected against contamination. In particular in the case of the fastening screw, not shown, that is arranged in the bore 110 and that enables a rotary movement, a contamination entry into the valve mechanics can be effectively minimized and the service life of the valve can thus be improved.

The plastic grip having an extrusion-coated stainless steel base part ensures a good corrosion resistance with simultaneously low manufacturing costs. Furthermore, the plastic of the grip remains cooler due to the limited thermal conductivity and can thereby be operated better.

A rotational speed regulation is preferably provided for the fan 44 such as can be seen in FIGS. 1 and 3, for example. The regulation takes place on the basis of a power consumption of the drive of the pump and of a temperature measured by a temperature sensor. In FIG. 1a, two temperature sensors 113 are shown that are connected to the control device 49. The temperature sensor 113.1 serves for the measurement of the temperature of the motor 34, namely of the motor windings. The temperature sensor 113.2 serves for the measurement of the temperature of a power module that is part of the drive electronics. For example, only one of the temperature sensors 113 can also be provided and/or further temperature sensors can also be provided.

The fan is controlled by means of PWM depending on the power consumption and the temperature of the power module that is e.g. accommodated in the electronics housing 48. The rotational speed is set analogously to the power consumption. However, the regulation is only permitted from a module temperature of 50° C. If the pump enters temperature ranges of a possible derating (power reduction due to the temperature), the maximum rotational speed of the fan is automatically controlled. It is made possible by this regulation that a minimum noise level is reached with a cold pump, that a low noise level—corresponding to the pump noise—is present at an end pressure or with a low load, that an ideal cooling of the pump is achieved at a simultaneously low noise level, and that the maximum cooling power is ensured before a power reduction due to the temperature.

The maximum rotational speed of the fan can be adapted, in particular depending on the situation. It can e.g. be expedient for a high water vapor compatibility to reduce the maximum rotational speed of the fan.

Figure 12:
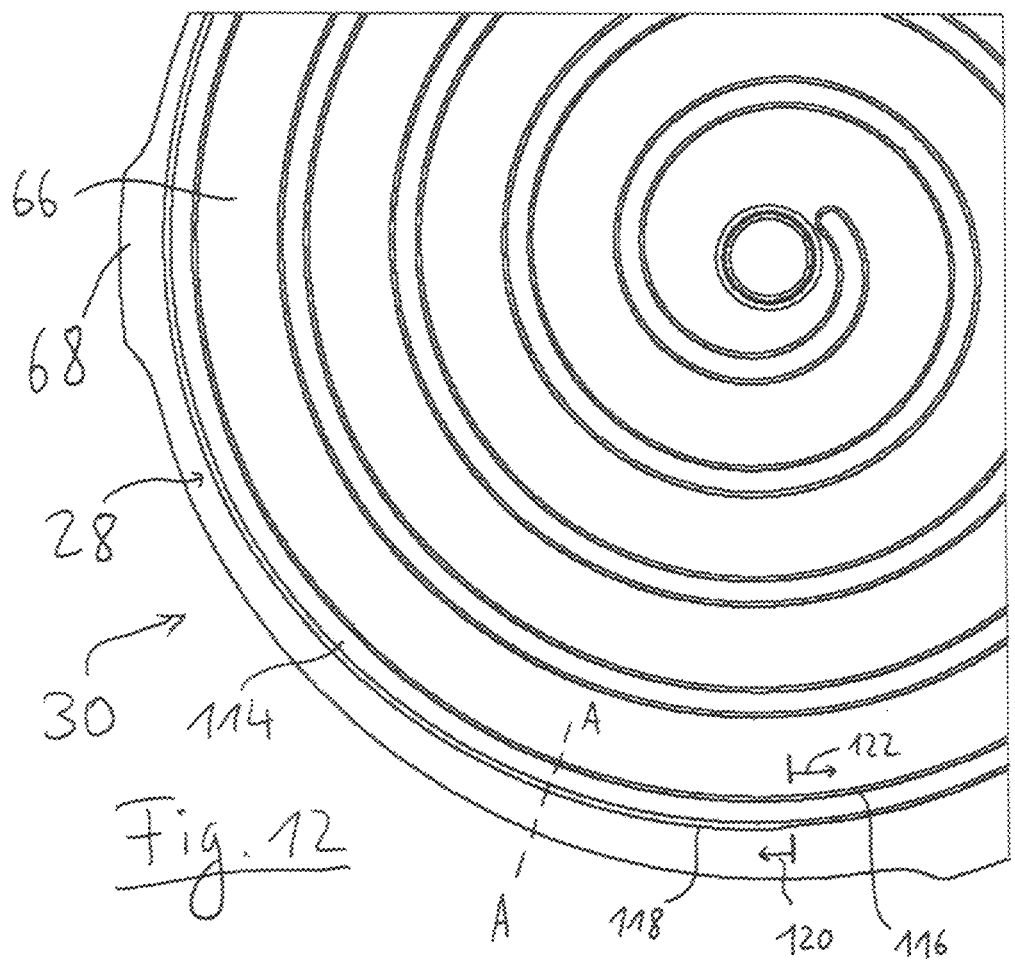
FIG. 12 shows a part region of the spiral component of FIGS. 5 and 6.
Figure 13:
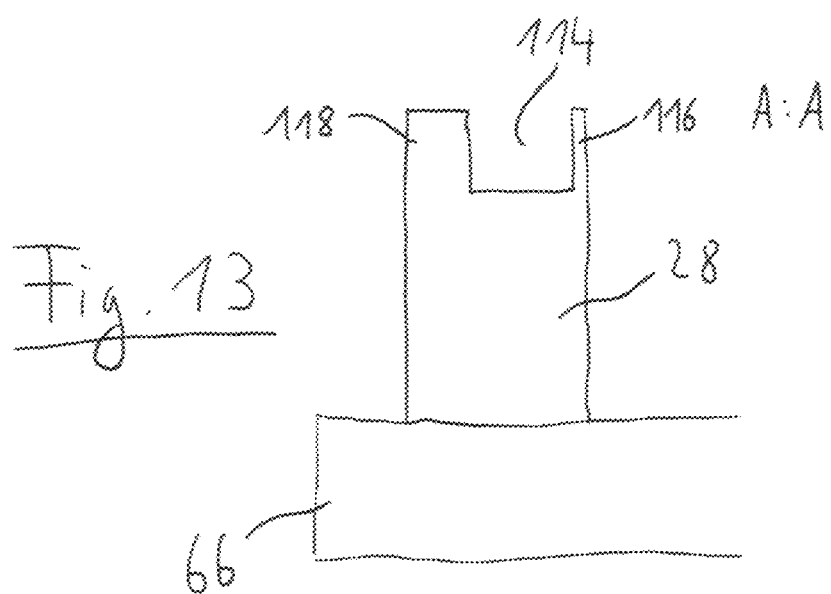
FIG. 13 shows a cross-section of the spiral component through the spiral wall in an outer end region.

In FIG. 12, the movable spiral component 30 is shown in part and enlarged with respect to FIG. 5. A sectional view of the spiral component 30 along the line A: A indicated in FIG. 12 is shown schematically and not to scale in FIG. 13.

At its end remote from the base plate 66 and facing a base plate of the fixed spiral component 24, not shown here, the spiral wall 28 has a groove 114 for the insertion of a sealing element 64 likewise not shown here, namely of a so-called tip seal. The arrangement in the operating state is e.g. easily visible in FIG. 4.

The groove 114 is bounded outwardly and inwardly by two oppositely disposed side walls, namely by an inner side wall 116 and by an outer side wall 118. In a first spiral section 120, the outer side wall 118 is thicker than the inner side wall 116 in the first spiral section 120 and thicker than both side walls 116 and 118 in another, second spiral section 122.

The first spiral section 120 extends from the location indicated in FIG. 12 to the outer end of the spiral wall 28 as is also indicated in FIG. 5, for example. The first spiral section 120 here by way of example extends over approximately 163°.

The first spiral section 120 forms an outer end section of the spiral wall 28. In this respect, the first spiral section 120 is at least partly arranged, and in particular completely arranged, in a non-pump active region of the spiral wall 28. The first spiral section 120 can in particular at least substantially completely fill the non-pump active region of the spiral wall 28.

As can be seen in FIG. 5, the first intermediate section 70 between two holding projections 68 that has a larger radial height than other intermediate sections 72 and 74 can preferably be arranged disposed opposite the first spiral section 120. An imbalance introduced by the thicker side wall 118 can thus be compensated by the larger weight of the first intermediate section 70.

For a low system load on the bearings and other components, the movable spiral component should generally preferably have a small inherent weight. Therefore, the spiral walls are generally very thin. Furthermore, smaller pump dimensions (significant outer diameter) result with thinner walls. The side walls of the tip seal groove are consequently particularly thin. The ratio of the tip seal wall thickness to the total spiral wall thickness e.g. amounts to at most 0.17. However, due to the tip seal groove, the spiral wall tip is very sensitive with respect to shocks on the handling such as on the assembly or on the change of the tip seal. The side wall of the groove can be pressed inwardly by slight impacts, e.g. also on the transport, so that the tip seal can no longer be assembled. To satisfy this problem, the groove comprises an asymmetrical wall thickness, in particular an outwardly local thickening of the spiral wall. This region is preferably not pump-active and can therefore be produced with a larger tolerance. Damage is considerably reduced by the one-sided thickening at the winding, in particular at the last half of the winding. A thickening of the spiral wall is preferably not necessary at other positions of the component since the wall is protected by projecting elements of the component.

The air guide hood 46 shown in FIG. 1 defines an air flow such as is indicated by a dotted arrow 124. The fan 44 is connected to a control device in the electronics housing 48 via a cable 125, not shown in FIG. 1, but visible in FIG. 1a, extending through the air guide hood 46 and via a plug-in connection. Said plug-in connection comprises a socket 126 and a plug 128. The socket 126 is supported at the electronics housing 48 and/or is fastened to a circuit board arranged in the electronics housing 48. The socket 126 is, for example, also visible in FIGS. 2 and 3. The plug 128 is connected to the fan 44 via the cable 125.

The plug-in connection 126, 128 is separated from the air flow 124 by a partition wall 130. The air flow 124 that can, for example, include dust or similar contamination is thus kept away from the plug-in connection 126, 128. On the one hand, the plug-in connection 126, 128 itself is thus protected and, on the other hand, the contaminants are prevented from entering the electronics housing 48 through the opening therein that is provided for the socket 126 and from reaching the control device and/or the power electronics.

Figure 14:
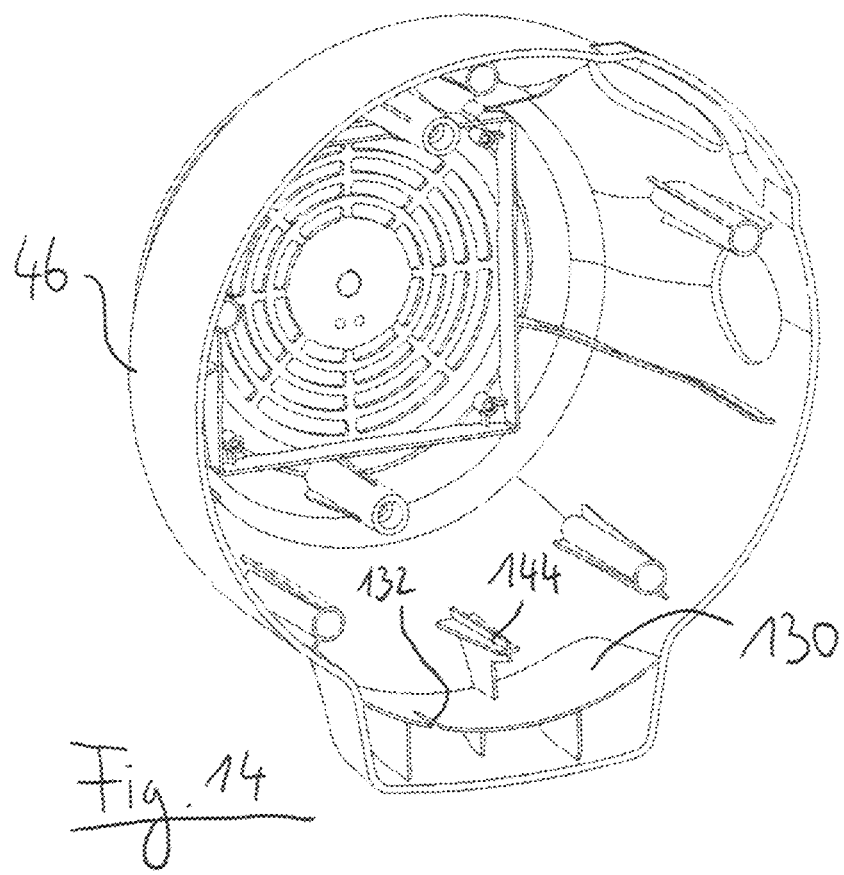
FIG. 14 shows an air guide hood of the scroll pump of FIG. 1 in a perspective view.

The air guide hood 46 is shown separately and perspectively in FIG. 14. Among other things, the partition wall 130 is visible with the space that is defined behind it and that is provided for the plug 128. The partition wall 130 comprises a recess 132, designed as a V-shaped notch here, for the leading through of a cable 125 from the plug 128 to the fan 44.

Inexpensive plug connectors without a sealing (e.g. no IP protection) can e.g. be used to save costs since the partition wall 130 ensures that the sucked-in air does not reach the electronics via the opening of the plug connector 126, 128. The cable of the fan is laterally led through the partition wall 130 through the V-shaped notch 132. The notch 132 has a lateral offset from the plug connector 126, 128, whereby a labyrinth effect and thus a further reduction of the leakage of cooling air to the plug connector 126, 128 can be achieved. The air flow into the channel 50 between the electronics housing 48 and the pump housing 22 is additionally improved by a partition wall 130 within the air guide hood 46. Less turbulence and counter-pressure thus arise for the fan 44.

Figure 15:
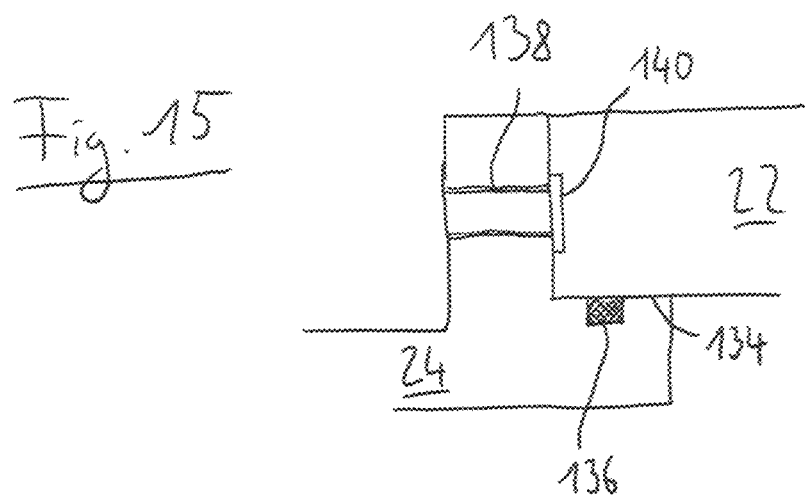
FIG. 15 shows a forcing-off thread in a sectional representation.

FIG. 15 shows a contact region between the first housing element 22 and the second housing element or a fixed-position spiral component 24 in a schematic sectional representation. The second housing element 24 is partly inserted into the first housing element 22 with a transition fit 134. A sealing by means of an O-ring 136 is provided in this respect. The transition fit 134, for example, also serves for the centering of the second housing element 24 with respect to the first housing element 22.

The second housing element 24, for example, has to be dismantled for maintenance purposes, for example for replacing the sealing element 64. In this respect, it can occur that the transition fit 134 or the O-ring 136 jams if the second housing element 24 is not pulled out straight enough. A forcing-off thread 138 is provided to solve this problem. A second forcing-off thread can preferably also be provided in an at least substantially radially oppositely disposed manner. To release the second housing element 24 in as straight and guided a manner as possible, a screw can be screwed into the forcing-off thread 38 until the screw projects from it and comes into contact with the first housing element 22. Due to a further screwing in, the housing elements 22 and 24 are pushed away from one another.

The fastening screws 142, as they are, for example, designated in FIGS. 1 and 3, provided for fastening the second housing element 24 to the first housing element 22 can, for example, be used for the forcing off. For this purpose, the forcing-off thread 138 preferably has the same kind of thread as fastening threads provided for the fastening screws 142.

A depression 140 that is associated with the forcing-off thread 138 is provided at the second housing element 22. If abrasion particles 138 are carried off on a screwing of the screw into the forcing-off thread 138, they collect in the depression 140. It is thus prevented that such abrasion particles, for example, prevent a complete contact of the housing elements 22 and 24 with one another.

The screws have to be unscrewed again on the assembly of the fixed-position spiral component 24 since otherwise a complete screwing (correct seat on the planar surface of the housing) of the fixed-position spiral component 24 to the first housing element 22 is prevented where possible. Leakage, misalignment and a reduction of the pump performance can be the result. To avoid this assembly error, the air guide hood 46 has at least one dome 144, in particular an additional dome 144, that is shown in FIG. 14 and that only enables an assembly of the air guide hood 46 when the screws used for the forcing off, in particular the fastening screws 142, have been removed again. This is because the air guide hood 46 with the dome 144 is configured such that it would collide with a screw head of a forcing-off screw possibly screwed into the forcing-off thread 138 so that the air guide hood 46 could not be completely assembled. The air guide hood 46 can in particular only be assembled when the forcing-off screws are completely dismantled.

REFERENCE NUMERAL LIST

20 scroll pump
22 first housing element
24 second housing element/fixed-position spiral component
26 spiral wall
28 spiral wall
30 movable spiral component
32 eccentric shaft
34 motor
36 rolling element bearing
38 eccentric pin
40 rolling element bearing
42 corrugated bellows
44 fan
46 air guide hood
48 electronics housing
49 control device
50 channel
52 chamber
54 rib
56 recess
58 rib
60 pressure sensor
62 channel
64 sealing element
66 base plate
68 holding projection
70 first intermediate section
72 second intermediate section
74 third intermediate section
76 clamping apparatus
78 three-jaw chuck
80 recess
82 balance weight
84 fastening bore
86 shaft shoulder
88 housing shoulder
90 gas ballast valve
92 actuation grip
94 plastic body
96 base element
98 bore
100 check valve
102 plug
104 fastening screw
106 rotatable element
108 bore
110 bore
112 cover
113 temperature sensor
114 groove
116 inner side wall
118 outer side wall
120 first spiral section
122 second spiral section
124 air flow
125 cable
126 socket
128 plug
130 partition wall
132 recess
134 transition fit
136 O-ring
138 forcing-off thread
140 depression
142 fastening screw
144 dome

What is claimed is:

1. A scroll pump, comprising:
   at least one pressure sensor integrated into the scroll pump; and
   a cooling device,
   wherein the at least one pressure sensor is disposed in a cooling air flow of the cooling device,
   wherein the at least one pressure sensor is disposed at least substantially at a start of the cooling air flow adjacent to the cooling device,
   wherein the at least one pressure sensor is positioned within an air guide hood of the scroll pump, and
   wherein a cable is attached to the at least one pressure sensor and passes through the air guide hood.

2. The scroll pump according to claim 1, wherein the cooling device is a fan.

3. The scroll pump according to claim 1,
   further comprising a fixed-position spiral component,
   wherein the at least one pressure sensor is disposed within the air guide hood and is screwed into the fixed-position spiral component.

4. The scroll pump according to claim 1, wherein the at least one pressure sensor is configured to measure a suction pressure of the scroll pump.

5. The scroll pump according to claim 1, wherein the at least one pressure sensor is configured to measure a pressure between two pump-active spiral walls or between two spiral walls in a pump-active spiral section.

6. The scroll pump according to claim 1, wherein the at least one pressure sensor is screwed into a component of the scroll pump.

7. The scroll pump according to claim 6, wherein the component into which the at least one pressure sensor is screwed is a housing element and/or a fixed-position spiral component.

8. The scroll pump according to claim 6, wherein the at least one pressure sensor is axially screwed into a fixed-position spiral component.

9. The scroll pump according to claim 1, wherein the at least one pressure sensor is screwed into a component of the scroll pump.

10. The scroll pump according to claim 9, wherein a control device is provided that is configured to automatically detect the at least one pressure sensor upon connection to the control device.

11. A scroll pump, comprising:
    at least one pressure sensor integrated into the scroll pump;
    a channel; and
    a cooling device,
    wherein the channel opens into a non-pump-active outer region between a spiral wall of a fixed-position spiral component and a spiral wall of a movable spiral component and/or the channel opens into a pump-active region between the spiral wall of the fixed-position spiral component and the spiral wall of the movable spiral component,
    wherein the at least one pressure sensor is positioned within an air guide hood of the scroll pump and a cable is attached to the at least one pressure sensor and passes through the air guide hood, and
    wherein the at least one pressure sensor is disposed in a cooling air flow of the cooling device.

12. The scroll pump according to claim 11, wherein the cooling device is a fan.

13. The scroll pump according to claim 12, wherein the at least one pressure sensor is disposed at least substantially at a start of the cooling air flow adjacent to the fan.

14. The scroll pump according to claim 11,
wherein the at least one pressure sensor is disposed within the air guide hood and is screwed into the fixed-position spiral component.

15. The scroll pump according to claim 11, wherein the at least one pressure sensor is configured to measure a suction pressure of the scroll pump.

16. The scroll pump according to claim 11, wherein the at least one pressure sensor is configured to measure a pressure between two pump-active spiral walls or between two spiral walls in a pump-active spiral section.

17. The scroll pump according to claim 11, wherein the at least one pressure sensor is screwed into a component of the scroll pump.

18. The scroll pump according to claim 17, wherein the component into which the at least one pressure sensor is screwed is a housing element and/or the fixed-position spiral component.

19. The scroll pump according to claim 17, wherein the at least one pressure sensor is axially screwed into the fixed-position spiral component.

20. The scroll pump according to claim 11, wherein a control device is provided that is configured to automatically detect the at least one pressure sensor upon connection to the control device.

\* \* \* \* \*